United States Patent
Mitsch (10) Patent No.: US 11,761,502 B2
(45) Date of Patent: Sep. 19, 2023

(54) ELASTIC JOINTS HAVING A TORSION STOP AND USE OF SUCH JOINTS IN VIBRATION ABSORBERS

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

(*) Notice: Subject to any disclaimer, the term of this patent is extended or adjusted under 35 U.S.C. 154(b) by 72 days.

(21) Appl. No.: 17/286,511

(22) PCT Filed: Oct. 12, 2019

(86) PCT No.: PCT/EP2019/000292
§ 371 (c)(1),
(2) Date: Apr. 19, 2021

(87) PCT Pub. No.: WO2020/088789
PCT Pub. Date: May 7, 2020

(65) Prior Publication Data
US 2021/0356011 A1   Nov. 18, 2021

(30) Foreign Application Priority Data
Oct. 31, 2018   (EP) .................................. 18000858

(51) Int. Cl.
*F16F 1/38*   (2006.01)
*F16F 1/393*   (2006.01)
(Continued)

(52) U.S. Cl.
CPC .......... *F16F 1/3821* (2013.01); *F16F 1/3935* (2013.01); *F16F 1/403* (2013.01); *E04H 9/0215* (2020.05)

(58) Field of Classification Search
CPC ........ F16F 1/403; F16F 1/3821; F16F 1/3935; E04H 9/0215
See application file for complete search history.

(56) References Cited

U.S. PATENT DOCUMENTS 2,069,270 A * 2/1937 Piron .................... F16F 1/3935
   267/141.1
3,777,672 A * 12/1973 Schneider ............... B61F 5/305
   267/3

(Continued)

FOREIGN PATENT DOCUMENTS

DE  2 062 797      7/1972
DE  37 45 044 C2   8/1994
(Continued)

OTHER PUBLICATIONS

International Search Corresponding to PCT/EP2019/000292 dated Feb. 7, 2020.
(Continued)

*Primary Examiner* — Vishal R Sahni
(74) *Attorney, Agent, or Firm* — Finch & Maloney PLLC (57) ABSTRACT

Novel elastic torsion stop components based on multilayer elastomer metal elements in cylindrical, conical, or spherical shape. The elastic torsion stop components are particularly suitable for use as maintenance-free and low-wear joints having a large angular spread, for example in vibration absorbers, such as in pendulum vibration absorbers for wind turbines.

16 Claims, 8 Drawing Sheets

(51) Int. Cl.
*F16F 1/40* (2006.01)
*E04H 9/02* (2006.01)

(56) References Cited

U.S. PATENT DOCUMENTS

| | | |
|---|---|---|
| 5,836,821 A | 11/1998 | Yamada et al. |
| 10,550,910 B2 | 2/2020 | Glanzner |
| 2012/0063915 A1 | 3/2012 | Kawabata et al. |
| 2019/0055982 A1* | 2/2019 | Mitsch .................... F16F 15/22 |

FOREIGN PATENT DOCUMENTS

| | | | |
|---|---|---|---|
| GB | 411 622 | 6/1934 | |
| GB | 532 393 | 1/1941 | |
| GB | 2160619 A | 12/1986 | |
| WO | 2012/121694 A1 | 9/2012 | |
| WO | 2012/153197 A2 | 11/2012 | |
| WO | 2016/023628 A1 | 2/2016 | |
| WO | WO-2017144167 A1 * | 8/2017 | ............. F03D 13/20 |

OTHER PUBLICATIONS

Written Opinion Corresponding to PCT/EP2019/000292 dated Feb. 7, 2020.

* cited by examiner

ELASTIC JOINTS HAVING A TORSION STOP AND USE OF SUCH JOINTS IN VIBRATION ABSORBERS

This application is a National Stage completion of PCT/EP2019/000292 filed Oct. 12, 2019, which claims priority from European patent application serial no. 18000858.3 filed Oct. 31, 2018.

FIELD OF THE INVENTION

The invention relates to novel torsion stop components based on multilayer elastomer metal elements having a cylindrical, conical, or spherical shape, which are particularly suitable for use as maintenance-free and low-wear joints having a large angular spread, for example in control link rods for vibration absorbers. According to the invention, joints of this kind, which can also be designed as Cardan joints, can be used in different devices, for example in vibration absorbers, in particular pendulum absorbers in machines to be damped, such as wind turbines.

BACKGROUND OF THE INVENTION

Particularly short pendulum joint rods are required for vibration absorbers having a high natural frequency. In order to achieve the necessary sufficient absorber amplitude, the joints have to travel long distances. In the prior art, this is possible in principle using universal joints consisting of sliding bearings or roller bearings. However, these bearings are susceptible to wear and require a larger space, which is often an additional problem in vibration absorbers for slim structures such as wind turbines.

One possible solution would be maintenance-free, purely elastic bush bearings. However, according to the prior art, maintenance-free elastomer bush bearings generally cannot allow the large deflection angles of 50° and greater that are required. This is due to the fact that, for the large angles, a very thick elastomer layer is required which must therefore be significantly smaller and therefore softer on the inner diameter than on the outside diameter. This can be compensated for to some extent by designing the bushings such that they are much longer on the inner diameter than on the outer diameter. However, this has the consequence that bushings of this kind have to be disproportionately long.

In principle it would also be possible to produce an elastomer having a stiffness that decreases toward the outside, as is described in DE 37 45 044 C2, for example. However, in addition to manufacturing techniques and difficulties, this would be disadvantageous in that the mechanical properties would be lower due to the elastomer being softer on the outside.

The problem addressed by the present invention is therefore that of developing an elastic joint which does not have the disadvantages described but which nevertheless allows deflection angles of greater than 50°.

SUMMARY OF THE INVENTION

The invention presented here is based on the idea of designing corresponding, purely elastic multilayer joints in such a way that the movement of the inner, soft layers is blocked according to an angle of rotation that is tolerable for the relevant layer thickness. The multilayer design of the elastic joints according to the invention increases the radial stiffness of the layer element.

This problem was solved as follows and in the claims.

The invention therefore relates to an elastic torsion joint which is capable of providing, in a plurality of stages to be determined, deflection angles of >25°, in particular >50°, preferably >75° up to preferably 90°, the elastic torsion joint comprising an elastic layer element (1)(2) which can move around an inner fixed joint axle or around an inner fixed joint ball and which is composed of a plurality of elastic concentric layers, generally two, three or four layers, that are separated from one another by sheets, characterized in that the joint axle (1.14) or the joint ball (2.7) is rigidly connected to the innermost elastic layer of the relevant layer element such that, when the layer element moves relative to the inner fixed joint axle or the inner fixed joint ball, said innermost elastic layer is deformed the most of all the layers, and the joint axle or the joint ball is connected to a torsion stop (1.4)(2.4) at at least one position of the layer element, the torsion stop and the layer element being designed such that, during a rotational movement of the layer element and joint axle relative to one another or during a cardanic movement of the layer element and joint ball relative to one another by a defined deflection angle (1.5)(2.20), the torsion stop strikes against the innermost sheet of the layer element (1)(2) that is closest to the joint axle or the joint ball such that, after the stop strikes against the sheet, the adjacent inner elastic sheet does not undergo any further deformation.

Figure 1:
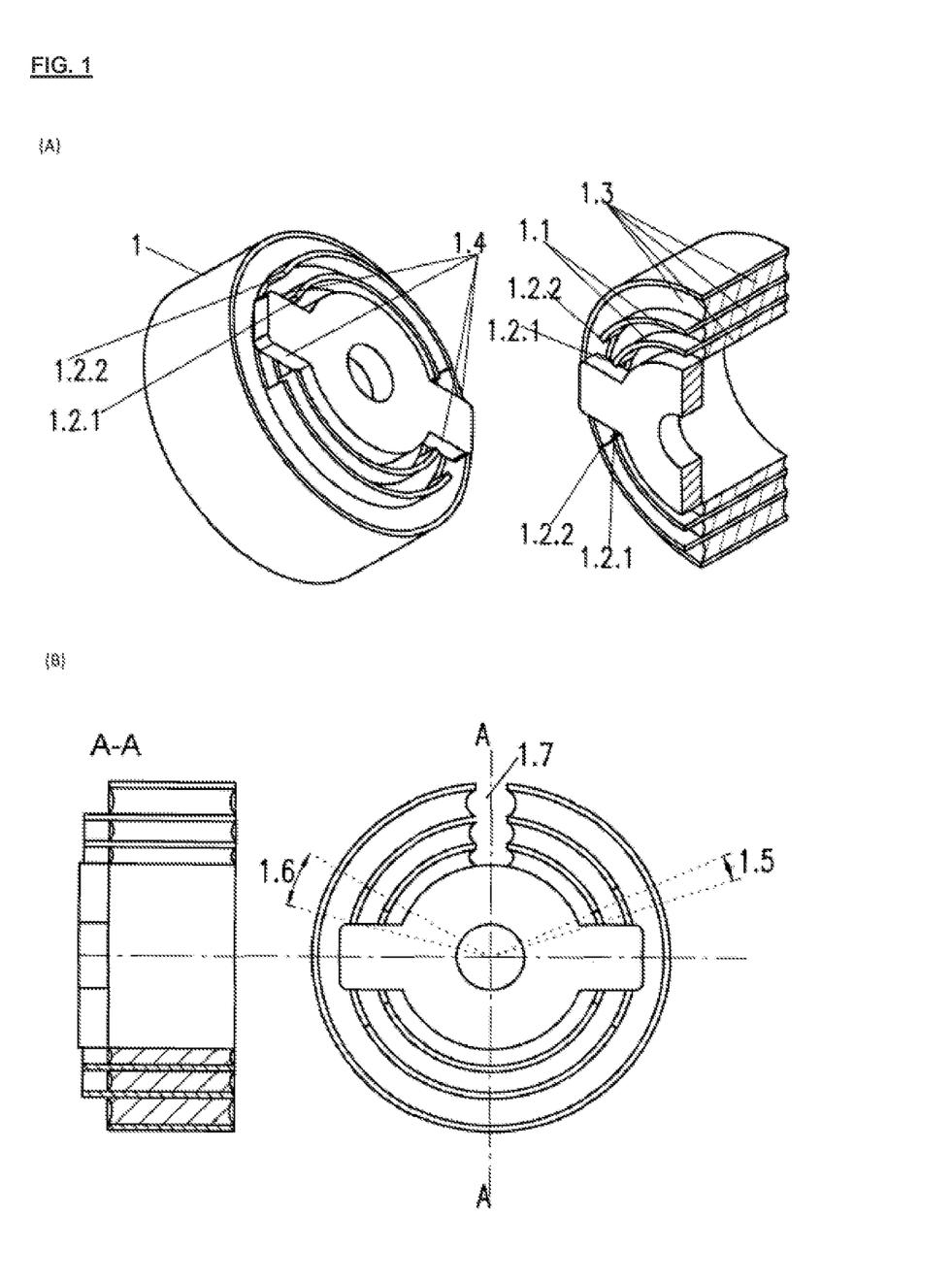
FIGS. 1A and 1B show a bushing according to the invention having a cylindrical layer element and stop function.

In a first embodiment of the invention, the elastic layer element is a cylindrical bushing (1) which is composed of layers of concentric, annular elastomer shaped bodies which are separated from one another by corresponding intermediate sheets. The bushing has a fixed axle or shaft (1.14) which is identical to the geometrical longitudinal axis of the bushing body. The layers are arranged in a ring around this fixed axle. The fixed axle is provided with a torsion stop (1.4) on one or both flat side ends of the bushing.

It is important that the central axle/shaft is rigidly connected to the innermost elastic layer of the bushing-shaped layer element. In the event of torsional rotational movements of the axle at a certain deflection angle, the innermost layer is initially deformed until the torsion stop (1.4) abuts against the innermost or one of the inner sheets. From this point on, no further deformation occurs, and therefore the elastic material of the inner layer cannot be overstressed.

If the rotation is continued by the application of a force, the next elastic layers of the elastic bushing body that are located further outward are deformed until the torsion stop strikes against the corresponding intermediate sheet located further outward. In principle this can be continued as required, depending on the number of layers or sheets. In this way, a large total deflection of up to and greater than 90° can take place in a targeted manner and in stages, without the elastomer element being damaged.

In order for the torsion stop (1.4) to be able to strike against the concentric annular intermediate sheets of the layer element at all in the event of a torsional movement of the layer element relative to the central axle, the elastic bushing body comprises inner intermediate sheets (1.2.1 and 1.2.2) protruding on one or on both of the flat sides thereof, from which intermediate sheets an angular segment having a center on the imaginary geometric axis of the bushing layer element is cut out, in which cut-out the torsion stop can move around the fixed axle and is thus able, within this movement space, to strike in stages against the side edges of the relevant intermediate sheet that were produced by the cut-out. The geometric arrangement and/or length of the intermediate sheets with respect to the stop element in this case determines the respective deflection angles of the joint according to the invention.

The torsion stop (1.4) can be struck in at least two ways according to the invention.

For one, the protruding intermediate sheets (1.2.1 and 1.2.2) can be different lengths or can project into the movement space for the torsion stop by different lengths, wherein it must be ensured that the length of an inner sheet is greater in each case than the length of the outer sheet, whereby a corresponding deflection angle (1.5)(1.6) can be determined. Strictly speaking, the relative inner sheet must extend further into the cut-out angular segment than the relative outer sheet. In this case, the torsion stop can simply be a bolt without its own profile, and the relevant deflection angle is determined by the geometric arrangement of the sheets in relation to the rotating stop element (1.4).

Figure 3:
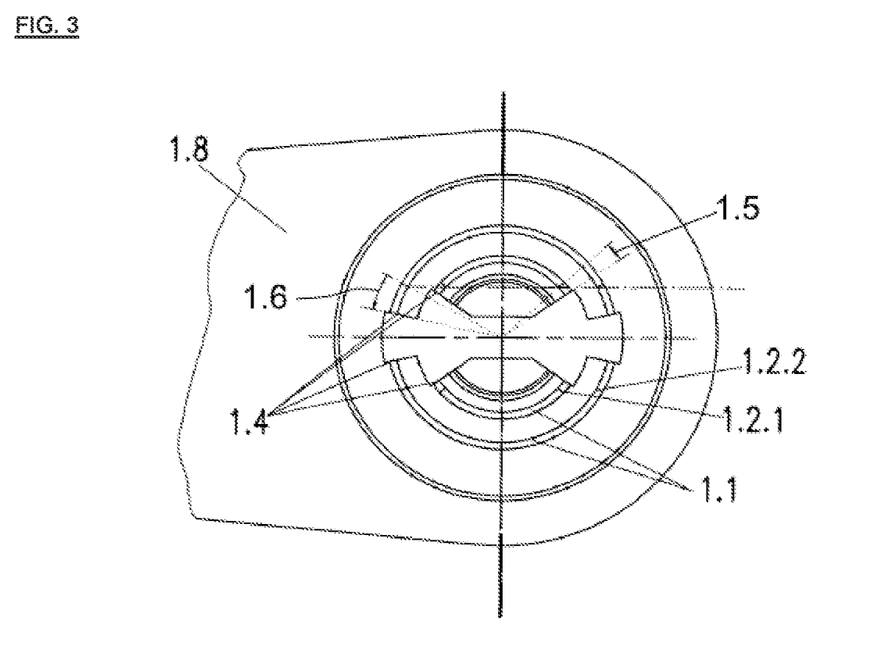
FIG. 3 is a view showing a corresponding cylindrical layer element, as in FIG. 1, but in this case all of the protruding intermediate sheets in the movement space of the stop are substantially the same length or protrude equally far into said cut-out.

Or, the protruding sheets (1.2.1)(1.2.2) can be the same length or can extend into the cut-out angular segment or the movement space produced thereby by the same length. In this case, the desired staged deflection angles (1.5)(1.6) can be achieved by correspondingly provided profiles on the torsion stop (1.4).

The bushing-shaped layer elements (1) according to the invention preferably have at least one separating slot or a prestressing window (1.7) longitudinally relative to the axle, so that it is possible for excess elastomer material to be pressed out of the layers into the free volume of the prestressing window when the joint is in operation. In addition, bushings are subject to shrinkage stresses as a result of the elastomer shrinking after vulcanization, and must therefore generally be compressed. Since it is not possible or it is not easily possible to compact the elastomer layers between the sheets, it is expedient to attach at least one prestressing window (1.7) to the circumference. Alternatively, it would be possible, for example, with even greater difficulty, to push a plurality of bushings comprising inner and outer sheets into one another after calibration (compression).

Figure 9:
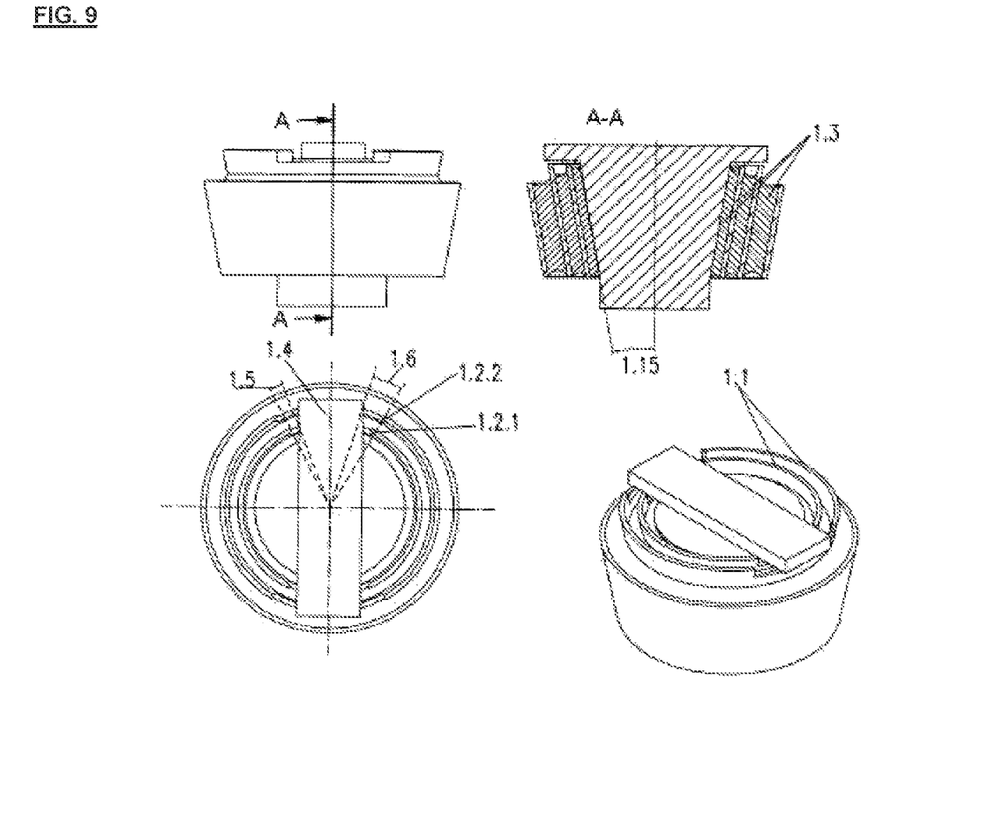
FIG. 9 shows an elastic bearing according to the invention comprising a torsion stop, the elastic bearing being constructed from a conical base body having correspondingly shaped, rotationally symmetrical, conical elastomer layers and metal plates arranged alternately around the cone axis.

In a modified second embodiment, the elastic layer element is a conical bushing (1), the cone axis corresponding to the axis of the cylindrical bushing described above. Otherwise, the conical body is also composed of layers of concentric, conical elastomer shaped bodies which are separated from one another by correspondingly shaped intermediate sheets. The structure described above for the cylindrical bushings and the mode of operation in interaction with the torsion stop and its required function can also be used for the conical bushing and is completely analogous to the cylindrical bushing.

The conical bushings are also advantageous in that they can also absorb forces perpendicularly to the torsion plane and can thus contribute to damping a pendulum absorber, so that this contribution is not contingent on torsional forces alone.

Figure 6:
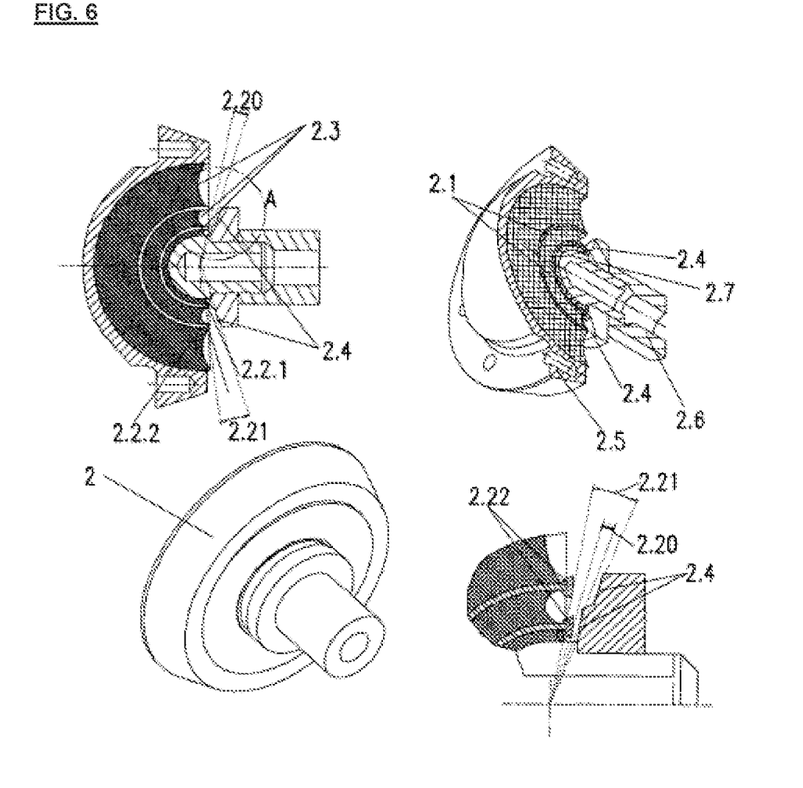
FIG. 6 shows the second basic embodiment of the invention, namely a ball joint having a spherical joint body, which has a cut-out in the center for a fixed joint ball which is rigidly connected to the innermost elastic layer and is moved or deformed during movement (deflection)

In a third embodiment of the invention, the elastic layer element is a spherical body which substantially has the shape of a spherical half-shell (2). An inner fixed joint ball (2.7) is attached, together with the torsion stop (2.4), to the center of the flat side of the half-shell. The joint ball is also directly connected to the innermost elastic layer of the spherical shell in this case. Like the elastic layers, the intermediate sheets also have a spherical shape.

In contrast to the first and second embodiment described above, the strike of the torsion stop (2.4) against the relevant intermediate sheets does not occur as a result of a counter rotational movement of the layer element and the torsion stop/axle, but instead occurs as a result of the stop being pressed against the relevant intermediate sheets due to a targeted cardanic movement of the ball joint according to the invention.

In this embodiment, cutting out a corresponding angular segment using protruding intermediate sheets is unnecessary, as are extra protruding intermediate sheets. In addition, the contact with the torsion stop takes place on the annular long edge, facing the stop, of the relevant intermediate sheet that protrudes from the spherical half-shell.

In a preferred embodiment of these spherical elements, the relevant contact surfaces against the intermediate sheets can be reinforced by means of circumferential stop elements (2.22), whereby the contact surface can also be enlarged.

In the embodiment presented here, the annular intermediate sheets protrude from the surrounding elastomer layers by the same distance. According to the invention, the staged deflection angle (2.21) (2.22) is adjusted in this case via the torsion stop (2.4), which has a profile structure that corresponds to the desired deflection angles on the side facing the sheets and is designed such that, when the stop is pressed, initially substantially only the innermost elastic layer is deformed, until the innermost sheet of the spherical layer element is hit by the first relevant profile structure of the stop (2.4). If the joint ball (2.7) is deflected further in the same direction, the second-innermost elastomer layer is deformed until the second-innermost intermediate sheet is hit by the second relevant profile structure of the stop. From the inside outward, according to the deflection performed in the joint, the joint is now compressed in stages in the relevant elastic layers to an acceptable level. The principle of deflection thus corresponds completely to the mode of operation for the cylindrical and conical layer elements (1), which have already been described in more detail above. In this case too, depending on the number and nature of the layers and intermediate sheets, one-stage, two-stage, three-stage, four-stage or any number-stage deflection angles can be achieved which ultimately add up to a large total deflection angle of at least 90°, without the elastic joint being damaged or noticeably worn.

The described layer elements (1)(2) according to the invention that have a staged angular function thus have at least two elastic layers with an intermediate sheet, so as to allow a single-stage deflection on the single intermediate sheet. However, the layer elements (1)(2) according to the invention preferably have at least three elastic layers with two intermediate sheets, whereby a two-stage deflection of the joint according to the invention can be achieved. Of course, even more (four, five, six, etc.) layers can be provided together with corresponding intermediate sheets.

The elastic layers of the torsion joints according to the invention are either of the same thickness or of different thicknesses. They are preferably of different thicknesses, the inner elastic layers being thinner than the outer layers on account of the acting forces, as long as the stiffness of the elastomer material in the layers is the same or similar. Of course, layers having different stiffnesses can also be used, which makes it possible to vary the layer thicknesses.

It is advantageous when the thickness of the individual layers is dimensioned according to the radial load. With the bushings having the same elastomer hardness and length, the inner layers have to be significantly thinner than layers with larger diameters for the same tolerable loads. Smaller diameters can withstand larger angles with the same layer thickness due to the smaller circumferential path of the rotational movement, and therefore the smallest possible diameters are often used for torsion elements.

Of course, smaller diameters also have a lower torsional stiffness, which is why it is expedient to support them according to the method described such that excessive angles of rotation that would damage the material are not possible.

In contrast to sliding or roller bearings of the prior art, the described layer elements (1)(2) according to the invention that have a staged angular function are maintenance-free and generally also more cost-effective. They can be used in mechanical and plant engineering wherever pivot angles or deflection angles of between 10° and 20° up to approximately 90° are required (for deflections smaller than 10°, a single elastomer layer without a stop function is usually sufficient).

DETAIL DESCRIPTION OF VARIOUS EMBODIMENTS OF THE INVENTION

FIGS. 1A and 1B show a bushing according to the invention having a cylindrical layer element and stop function. The bushing comprises intermediate sheets protruding on one side. A movement space for the torsion stop in the form of an angular segment is cut out from these protruding intermediate sheets. The intermediate sheets extend into the movement space by different lengths, with the innermost sheet extending further in, i.e. being relatively longer, than the second-innermost sheet, and so on. The resulting deflection angles for the torsion stop are indicated by (1.5) (innermost and smallest angle) and (1.6) (second-innermost and larger angle). The bushing comprises a prestressing window (1.7) in all layers.

Figure 2:
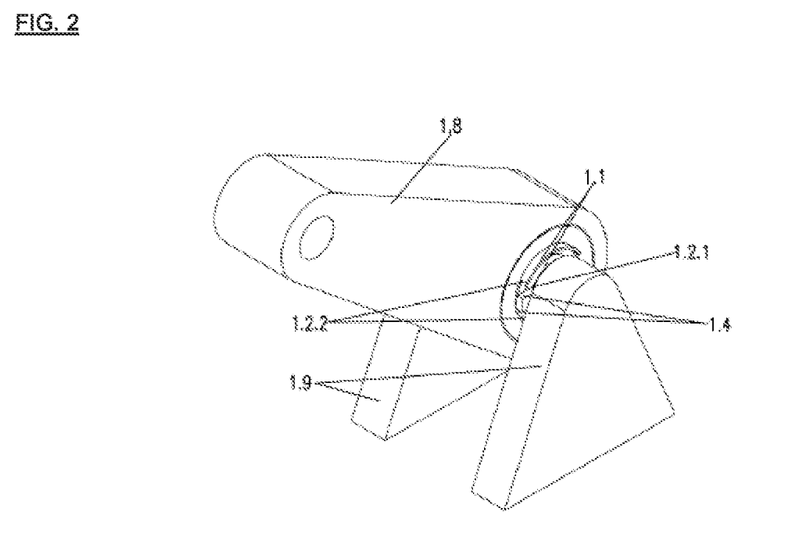
FIG. 2 is a perspective view showing a control link lever for large angular deflection, which lever has a corresponding component according to FIG. 1 in its eye.

FIG. 2 shows a control link lever (1.8) for large angular deflection, which lever has a corresponding component according to FIG. 1 in its eye.

FIG. 3 shows a corresponding cylindrical layer element as in FIG. 1, but in this case all of the protruding intermediate sheets in the movement space of the stop are substantially the same length or protrude equally far into said cut-out. The stop element (1.4) comprises correspondingly different beveled surfaces for striking against the relevant intermediate sheet, according to the desired deflection angle (1.5)(1.6).

The figure shows, in detail, a double Cardan joint for the suspension of a transverse mass damper.

Figure 4:
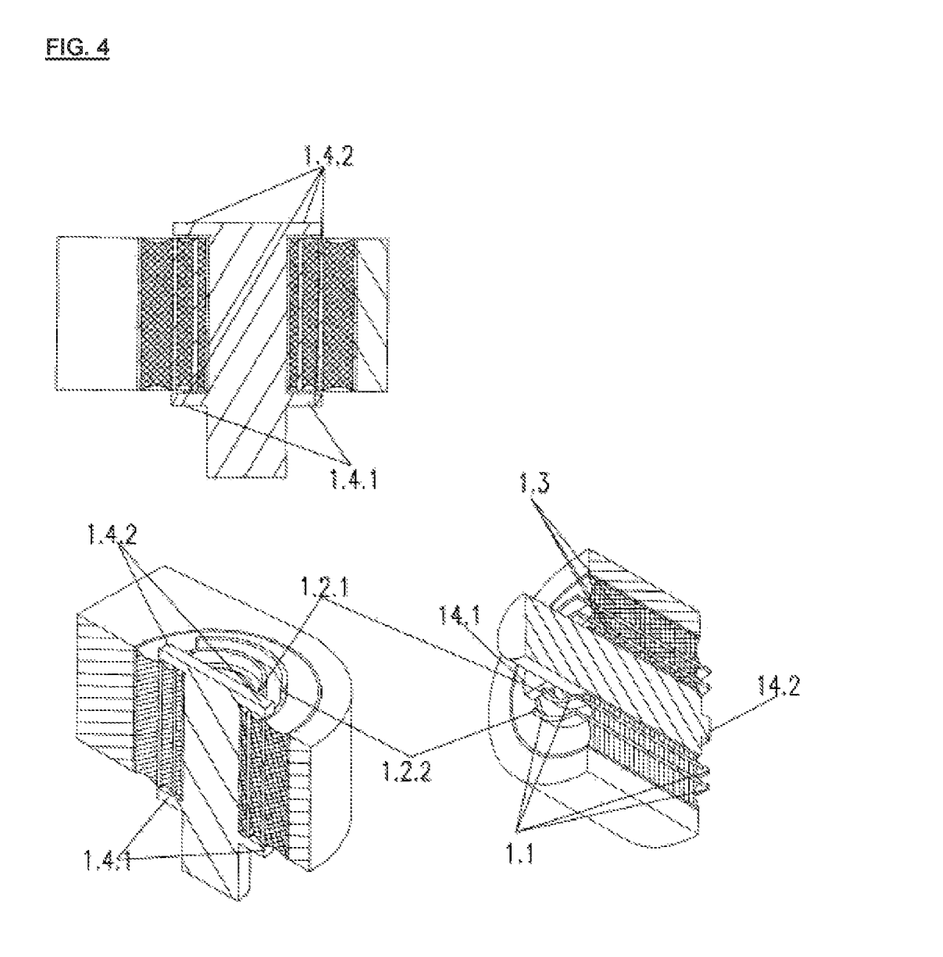
FIG. 4 shows a bushing-shaped layer element, corresponding to FIG. 1, but which has intermediate sheets that protrude on both flat sides of the bushing and comprise cut-outs, each for a torsion stop.

FIG. 4 shows a bushing-shaped layer element (1) corresponding to FIG. 1, but which has intermediate sheets that protrude on both flat sides of the bushing and comprise cut-outs, each for a torsion stop (1.4). In the embodiments of FIGS. 1-4, the intermediate sheets 1.1 protrude further out than the elastomer layer 1.3 at least on one side; in principle, this extension can also be achieved on both ends of the bushing. The intermediate sheets 1.1 are provided with a cut-out 1.2.1 and 1.2.2 which releases a particular angle. At the same time, a torsion stop 1.4 is connected to the axle. After a particular angle 1.5, it carries along the inner sheet on the stop 1.2.1 such that no further deformation of the inner layer occurs. At an even larger angle 1.6, the second sheet 1.2.2 is carried along by the torsion stop 1.4. FIG. 1 shows a component comprising three layers in which two sheets are moved by the torsion stop 1.4. In principle, any number of layers having the relevant stop function can be arranged.

Figure 5:
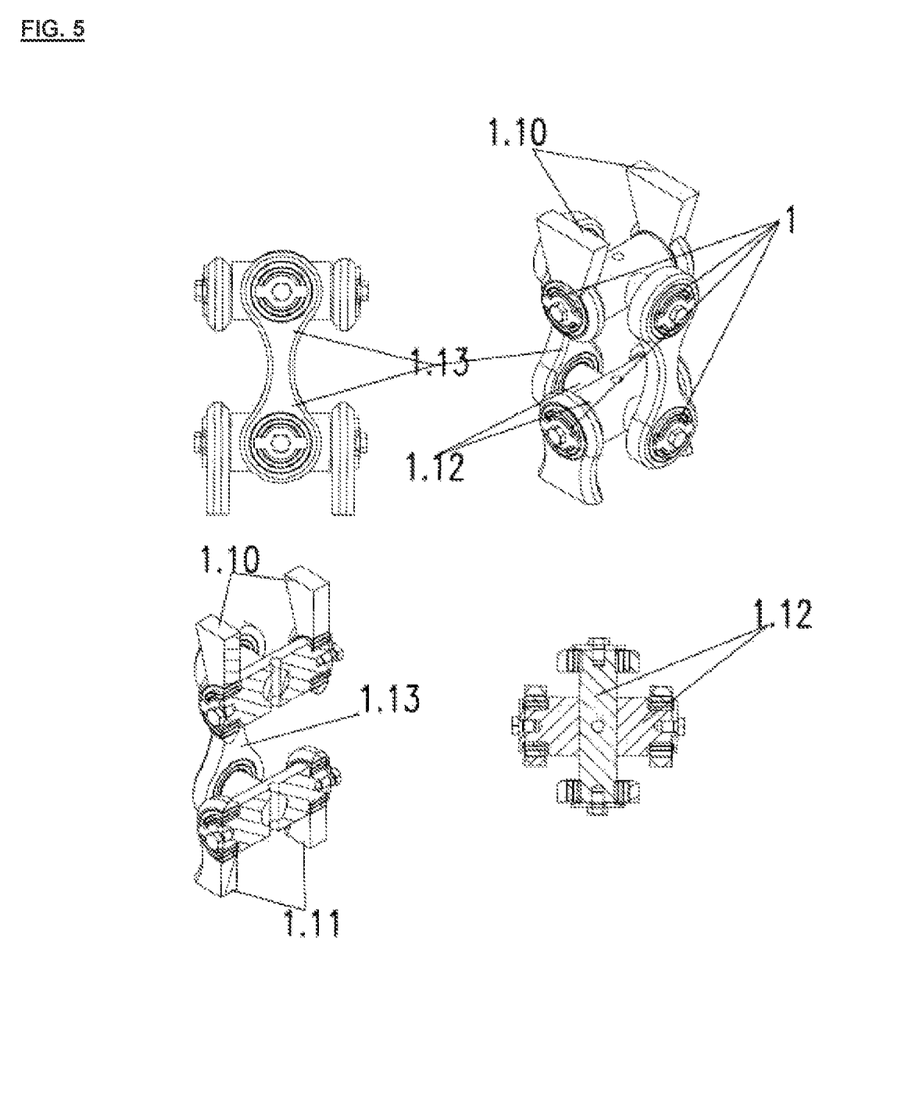
FIG. 5 shows various views of elastomer Cardan joints and double Cardan joints which are provided with the bushings, according to the invention from FIGS. 1-4, and are therefore ideally suited for large deflections.

FIG. 5 shows various views of elastomer Cardan joints and double Cardan joints which are provided with the bushings according to the invention from FIGS. 1-4 and are therefore ideally suited for large deflections.

FIG. 6 shows the second basic embodiment of the invention, namely a ball joint having a spherical joint body, which has a cut-out in the center for a fixed joint ball (2.7) which is rigidly connected to the innermost elastic layer and is moved or deformed during movement (deflection). The possible total deflection angle is composed of the angles (2.20) and (2.21) and is achieved in this specific case by two stages in the profile of the stop (2.4). Circumferential stop elements (2.22) attached to the end part of the respective annular intermediate sheets increase the accuracy of the strike between the stop element (2.4) and the intermediate sheets of the spherical layer element.

The ball joint according to the invention consists of a plurality of hemispherical elastomer layers (2.3). These are stacked one on top of the other and connected to one another by attached hemispherical sheets (2.1). The outer bell (2.5) rotates around the inner ball (2.7).

Since the circumference of the inner ball is significantly smaller than that of the outer bell, the elastomer would rotate almost only in the inner region. In the outer region there would only be elastic material that does not take part in the deformation. This is prevented by the spherical intermediate sheets (2.1) each co-rotating in stages according to a particular angle and thus experiencing only a limited torsional movement. The stop ring (2.4) in this case rotates together with the inner ball (2.7) and, after a certain angle, rests against the sheet edge (2.2.1), and is further rotated together with said edge. After a further angle, the stop (2.2.2) comes into engagement such that ultimately only the outermost layer can deform. The ball joint according to the invention can be used wherever a large angular movement has to take place in the space. By comparison with the bushing comprising a Cardan joint, the ball joint does not need a cardanic arrangement to allow spatial movement.

Figure 7:
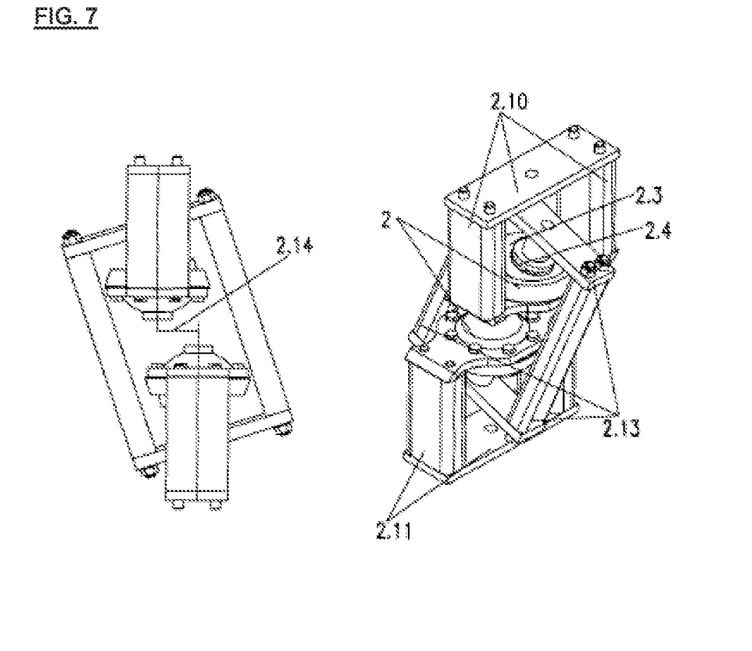
FIG. 7 shows the application of two connected spherical joints, according to FIG. 6, to form a Cardan joint operating in one plane.

FIG. 7 shows the application of two connected spherical joints according to FIG. 6 to form a Cardan joint operating in one plane.

Figure 8:
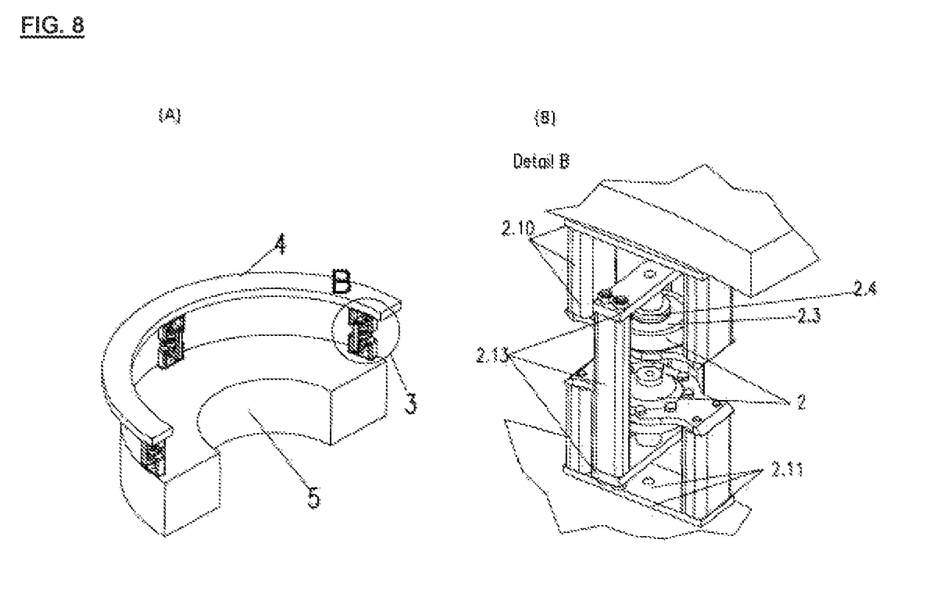
FIGS. 8A and 8B shows the possible use of a Cardan joint, according to the invention according to FIGS. 6 and 7, with a pendulum absorber, as can typically be used in a wind turbine.

FIGS. 8A and 8B show the possible use of a Cardan joint according to the invention according to FIGS. 6 and 7 with a pendulum absorber, as can typically be used in a wind turbine. The joints are integrated in pendulum rods (3), and the joints are connected at their upper end to the supporting structure of the system (e.g. the tower of the wind turbine) and at the other end to the pendulum mass (5). The mass (5) can thus swing freely transversely in the horizontal plane by a large deflection angle.

FIG. 9 shows an elastic bearing according to the invention comprising a torsion stop, the elastic bearing being constructed from a conical base body having correspondingly shaped, rotationally symmetrical, conical elastomer layers (1.3) and metal plates (1.1) arranged alternately around the cone axis, the cone angle (1.15) being formed by the longitudinal axis and the conical surfaces inclined thereto. In addition to the actual stop element (1.4), the inner and outer stop angles (1.5) (1.6) can also be seen here.

FIG. 10(A) is a perspective view of a pendulum suspension (6) which is fastened to a support structure (6.5). The pendulum suspension comprises a twin-shaft Cardan joint or universal joint (6.1), as well as a transmission gear (6.2) and a damping element (6.6) at one end of each of the two shafts of the joint. The pendulum rod (6.8) at the lower end of the suspension (6.7) is only shown in part. The two damping elements (6.6) on the shafts can be provided with rotational masses (6.6.1) (not shown separately in this case), which masses are optional and can be omitted if no additional frequency setting is desired or necessary. The elastic bearings according to the invention comprising an elastic torsion stop (6.4), in the form of the described cylindrical elastomer bushings, the spherical half-shells or the conical elastomer bushings, are not shown.

The damping units (6.6) are preferably operated by means of eddy currents, and comprise a preferably rotationally symmetrical conductor disk and a likewise preferably rotationally symmetrical disk that is provided with permanent magnets or electromagnets and is made of steel, ceramic or plastics material, for example. Both disks are in this case arranged opposite one another and separated from one another by an air gap, and move relative to one another around the shaft, triggered by a pendulum movement, thus creating an eddy current that generates a force counter to the force moving the pendulum, so that the pendulum movement is damped or decelerated.

Furthermore, the eddy current damping unit (6.6) can additionally have an optionally variable adjustable rotational mass, as described in more detail in WO 2019/029839. As a result, and additionally by using disks having different diameters in order to increase the speed of rotation of the regions of the disks comprising the magnets, the natural frequency of the vibration system can be influenced or the vibration system can be adapted to the vibrational conditions.

FIG. 10(B) shows the Cardan joint from (A) from a different perspective as a component of the pendulum suspension, comprising elastomer bushings (19)(19.1) and torque supports (23), an inner lever (23.1), an outer lever (23.2), an elastic stop (23.3) and torque supports having an idle angle (24), (inner lever 24.1), (outer lever 24.2), (elastic stop 24.3) and free movement angle (24.4).

Figure 10:
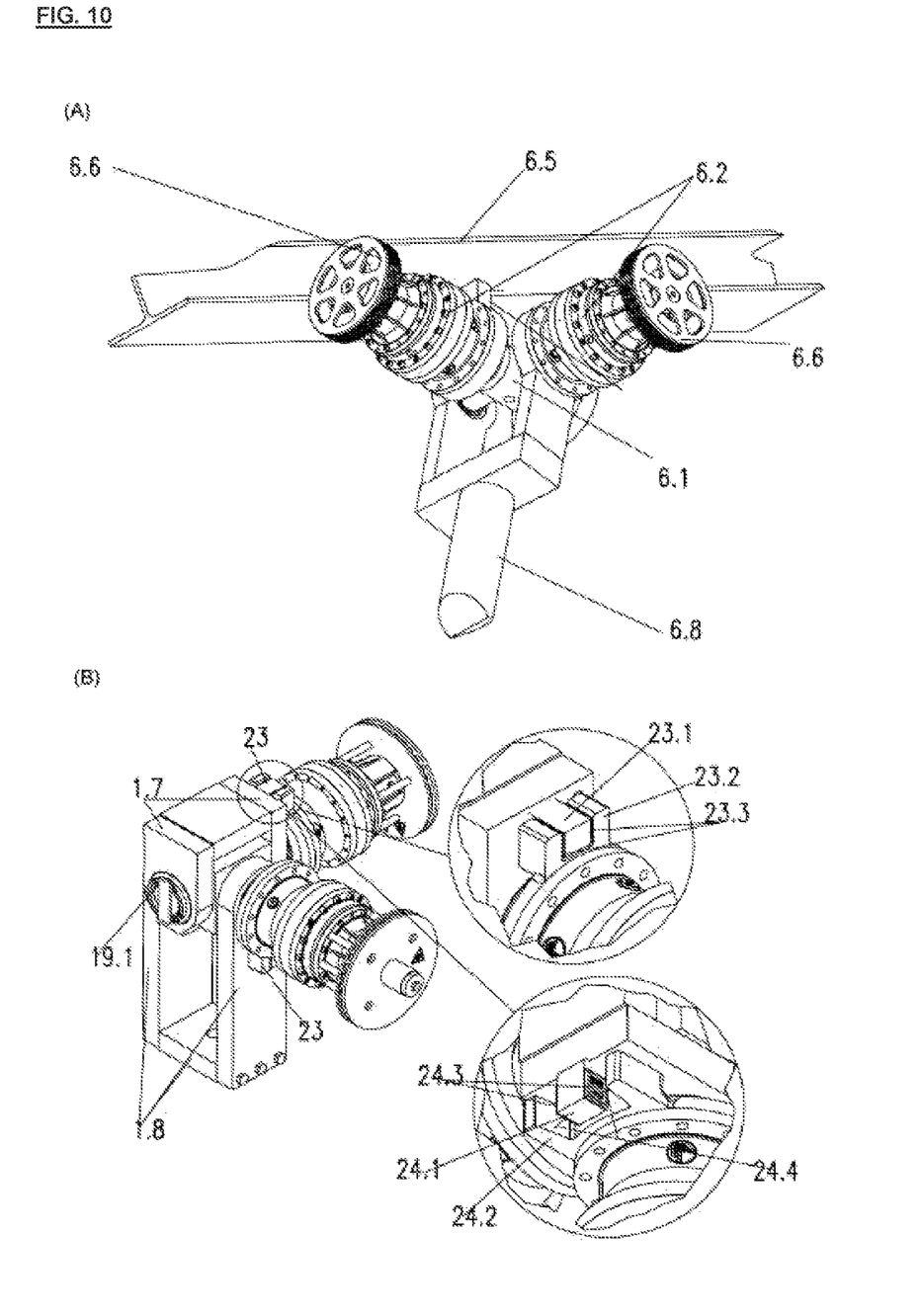
FIGS. 10A and 10B are perspective views of a pendulum suspension which is fastened to a support structure.
Figure 11:
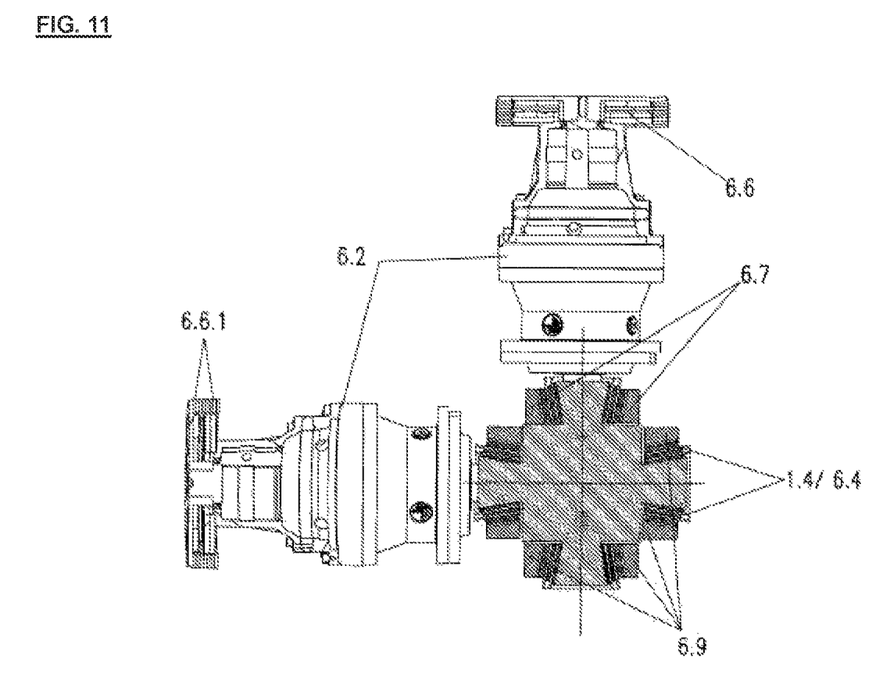
FIG. 11 shows the cardanic pendulum suspension of FIG. 10 in a plan view, in which the position and attachment of the elastic bearings according to the invention described here that comprise an elastic torsion stop are indicated at both ends of the two shafts of the Cardan joint, with said bearings, which are installed in corresponding brackets, only being indicated schematically.

FIG. 11 shows the cardanic pendulum suspension of FIG. 10 in plan view, in which the position and attachment of the elastic bearings according to the invention described here that comprise an elastic torsion stop (1.4)(6.4) are indicated preferably at both ends of the two shafts of the Cardan joint, with said bearings, which are installed in corresponding brackets (6.9), only being indicated schematically. On the gear side, the shafts are also guided by a bracket (6.7).

Figure 12:
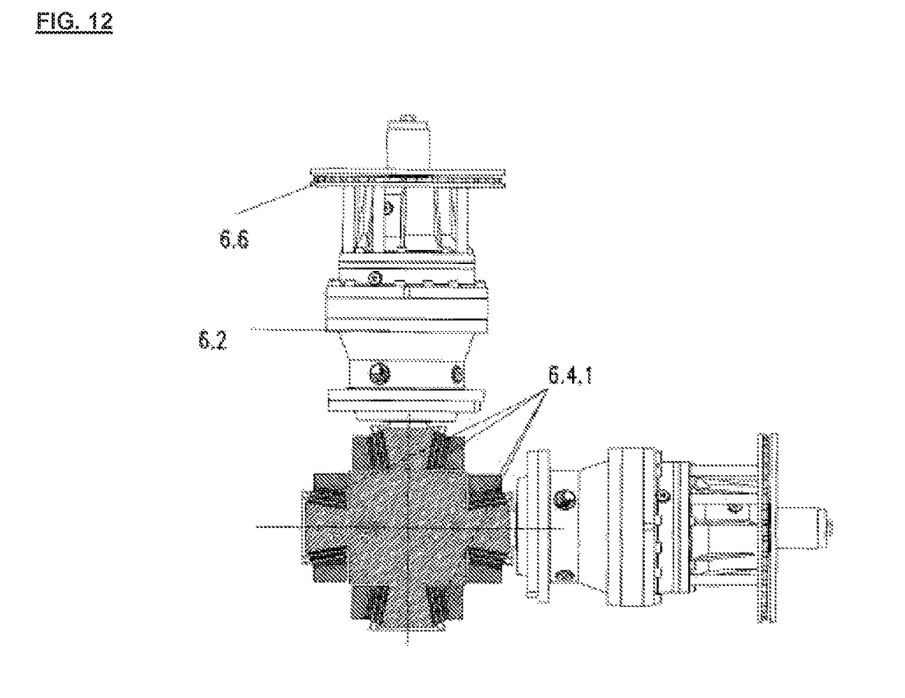
FIG. 12 shows the cardanic pendulum suspension of FIG. 11, provided with conical elastomer bushings, according to the invention, comprising an elastic torsion stop, as shown in FIG. 9, for example.

FIG. 12: shows the cardanic pendulum suspension of FIG. 11, provided with conical elastomer bushings (6.4.1) according to the invention comprising an elastic torsion stop (6.4), as shown in FIG. 9, for example.

The invention claimed is:

1. An elastic torsion joint of a pendulum vibration absorber, which is capable of providing multi-stage deflection angles of at least 50° deflection, the elastic torsion joint comprising:
   (i) an inner fixed joint ball,
   (ii) an elastic layer element which can move around the inner fixed joint ball and which is composed of a plurality of concentric annular elastic layers that are separated from one another by intermediate concentric annular metal sheets, and
   (iii) a torsion stop,
   wherein
   (iv) the elastic layer element (2) substantially has a shape of a spherical half-shell, to the center of the flat side of which said inner fixed joint ball (2.7) is attached together with the torsion stop (2.4), which is a stop ring,
   (v) the inner fixed joint ball (2.7) is rigidly connected to the innermost elastic layer of the layer element such that, when the layer element moves relative to the inner fixed joint ball, said innermost elastic layer is deformed the most of all the layers, and the joint ball is functionally operatively connected to the torsion stop ring,
   (vi) the torsion stop ring (2.4) and the layer element are designed such that, the torsion stop ring strikes by pressing against the innermost intermediate metal sheet of the layer element (2) closest to the joint ball during a cardanic movement of the layer element (2) and the inner fixed joint ball (2.7) relative to one another by at least a first defined deflection angle (2.20), thus the adjacent outward-positioned concentric annular elastic layer of the elastic layer element (2) being unable to undergo any further deformation,
   (vii) the torsion stop ring (2.4) has a profile structure that corresponds to the at least first defined deflection angle on the side facing the annular intermediate metal sheets, and strikes against the annular long edge, facing the torsion stop, of the relevant annular intermediate metal sheet that protrudes from the spherical half-shell, (viii) the concentric annular metal sheets are provided with circumferential stop elements (2.22) at each of the points against which the torsion stop ring (2.4) presses during deflection, and (ix) the elastic layer element (2) comprises at least three elastic layers, wherein the inner concentric annular elastic layers of the elastic layer element (2) are thinner than the outer layers provided that stiffness of the elastomer material in the elastic layers is the same or similar.

2. The elastic torsion joint according to claim 1, wherein the profile structure of the torsion stop ring (2.4) corresponds to a second defined deflection angle (2.21) of the joint, and the torsion stop ring strikes against the nearest outward-located concentric annular intermediate metal sheets.

3. The elastic torsion joint according to claim 2, wherein profile structure of the torsion stop ring (2.4) corresponds to a further defined deflection angle of the joint, and the torsion stop strikes concentric annular intermediate metal sheets located further outward in stages according to further deflection angles.

4. A Cardan joint, wherein the Cardan joint comprises an elastic torsion joint according to claim 1.

5. The Cardan joint according to claim 4, wherein the Cardan joint additionally comprises eddy-current-operated damping elements (6.6).

6. The Cardan joint according to claim 4, wherein the Cardan joint comprises a transmission gear (6.2).

7. A vibration absorber comprising an elastic torsion joint according to claim 1.

8. A vibration absorber comprising a Cardan joint according to claim 4.

9. A vibration absorber, wherein the vibration absorber comprises a pendulum which is connected via a control link lever (1.8) to an elastic torsion joint according to claim 1.

10. A vibration absorber, wherein the vibration absorber comprises a pendulum which is connected via a control link lever (1.8) to a Cardan joint according to claim 4.

11. A wind turbine, wherein the wind turbine comprises an elastic torsion joint according to claim 1.

12. A wind turbine, wherein the wind turbine comprises a Cardan joint according to claim 4.

13. A wind turbine, wherein the wind turbine comprises a pendulum vibration absorber which is provided with the elastic torsion joint according to claim 1.

14. An elastic torsion joint of a pendulum vibration absorber, which is capable of providing multi-stage deflection angles of at least 50° deflection, the elastic torsion joint comprising:

(i) an inner fixed joint ball, (ii) an elastic layer element which can move around the inner fixed joint ball and which is composed of a plurality of concentric annular elastic layers that are separated from one another by intermediate concentric annular metal sheets, and (iii) a torsion stop, wherein (iv) the elastic layer element (2) substantially has a shape of a spherical half-shell, to the center of the flat side of which said inner fixed joint ball (2.7) is attached together with the torsion stop (2.4), which is a stop ring, (v) the inner fixed joint ball (2.7) is rigidly connected to the innermost elastic layer of the layer element such that, when the layer element moves relative to the inner fixed joint ball, said innermost elastic layer is deformed the most of all the layers, and the joint ball is functionally operatively connected to the torsion stop ring (2.4), (vi) the torsion stop ring (2.4) and the layer element are designed such that, the torsion stop ring strikes by pressing against the innermost intermediate metal sheet of the layer element (2) closest to the joint ball during a cardanic movement of the layer element (2) and the inner fixed joint ball (2.7) relative to one another by at least a first defined deflection angle (2.20), thus the adjacent outward-positioned concentric annular elastic layer of the elastic layer element (2) being unable to undergo any further deformation, (vii) the torsion stop ring (2.4) has a profile structure that corresponds to the at least first defined deflection angle on the side facing the annular intermediate metal sheets, and strikes against the annular long edge, facing the torsion stop, of the relevant annular intermediate metal sheet that protrudes from the spherical half-shell, and (viii) the elastic layer element (2) comprises at least two elastic layers, wherein the inner concentric annular elastic layers of the elastic layer element (2) are thinner than the outer layers provided that stiffness of the elastomer material in the elastic layers is the same or similar.

15. The elastic torsion joint according to claim 14, wherein the concentric annular metal sheets are provided with circumferential stop elements (2.22) at each of the points against which the torsion stop ring (2.4) presses during deflection.

16. The elastic torsion joint according to claim 14, wherein the elastic layer element (2) comprises at least three elastic layers.

\* \* \* \* \*